INVENTOR
FRED M. STERN
BY E. R. Kockey
AGENT

United States Patent Office 3,342,690
Patented Sept. 19, 1967

3,342,690
INTERNAL STEAM SEPARATION, PUMPING AND FLOW PATH IN BOILING WATER REACTORS
Fred M. Stern, West Hartford, Conn., assignor to Combustion Engineering, Inc., Windsor, Conn., a corporation of Delaware
Filed Dec. 30, 1964, Ser. No. 422,294
8 Claims. (Cl. 176—54)

This invention relates to boiling water reactors and, in particular, to the steam separation, water circulation, and recirculating pumps therein.

The most economical boiling water reactor is one in which the water circulation is produced by the differential hydrostatic head existing between the reactor core and riser and the downcomer. This is caused by steam bubbles which are being generated in the core and flow up through the riser while the downcomer has only water flowing in it. The difference in effective density between the core, riser, and the downcomer is the cause of the flow in a natural circulation boiling water reactor.

Unfortunately, as the size of boiling water reactors increases and their steam production increases, the natural circulation flow is not sufficient to provide adequate circulation unless the reactor pressure vessel is made unduly large to allow for a very high riser and very large downcomer area. It is therefore common practice in large boiling water reactors to replace the natural circulation driving force by pumps located outside of the reactor vessel. This necessitates large piping through which the circulating flow is passed from above the core, through the pumps, and back into the bottom of the pressure vessel. This procedure is expensive for three reasons: (1) the volume of water in the system is large and provisions must be made in the reactor containment to contain the energy within the water in case of an accident; (2) the piping is quite expensive; and (3) the pumps consume a substantial amount of the electricity generated by the plant.

It is also particularly important in a boiling water reactor that good separation of water and steam be obtained. Carryover of water tends to damage turbine blades with possible entrained solids which tend to produce radioactive deposits on the turbine blading and on other locations throughout the system. On the other hand, carryunder of steam into the downcomer tends to produce additional steam voids in the core with a resilient reduction in the core performance. Good separation of steam and water is desired throughout the entire range of steam flows. Conventionally a separator is designed for the full load capability of the unit. At full load, of course, the steam velocities are at a maximum and the centrifugal action available from centrifugal separators is at a maximum. However, on decreasing steam flow the velocities decrease and the efficiency of the centrifugal separator decreases. When a reactor has a relatively large steam space above the water level, there is time for gravity separation, and the increased efficacy of such gravity separation at low loads compensates for the ineffectiveness of the centrifugal separator at these below design load ratings. It would be preferable to have a separator which maintained its separating efficacy at these lower ratings without depending on compensation by gravity.

In my invention a centrifugal steam separator is rotatably mounted so that the steam-water mixture from a boiling water reactor core passes through the separator. This separator is connected to drive a circulating pump which circulates water through the reactor core. As the steam generation is increased additional power is delivered to the rotatable separator, driving the circulating pump at a higher rate of speed, thereby tending to increase the circulation ratio and decreasing the steam voids. This pump being connected to the rotatable separator impresses a load on the separator resisting rotation which is proportional to the rate of rotation. At higher steam flows however the separator rotates much more rapidly than it does at lower steam flows. The actual centrifugal motion delivered to the steam-water is a combination of its motion through the separator and the separator's motion, and the blades are necessarily of the backward curved type. The effective centrifugal motion delivered to the steam-water mixture imposed by the blading is higher at those low loads where the separator is rotating slowly. Accordingly, increased separation is obtained at these lower than design capability ratings, as compared to that with a set of fixed blades designed for the same full load condition.

It is an object of this invention to provide a boiling water reactor with a steam separator which is more effective in maintaining its efficiency over a wide range of steam flows.

It is a further object to provide a boiling water reactor with an integral circulating pump which is driven by the effluent from the reactor core.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawings wherein.

Figure 1:
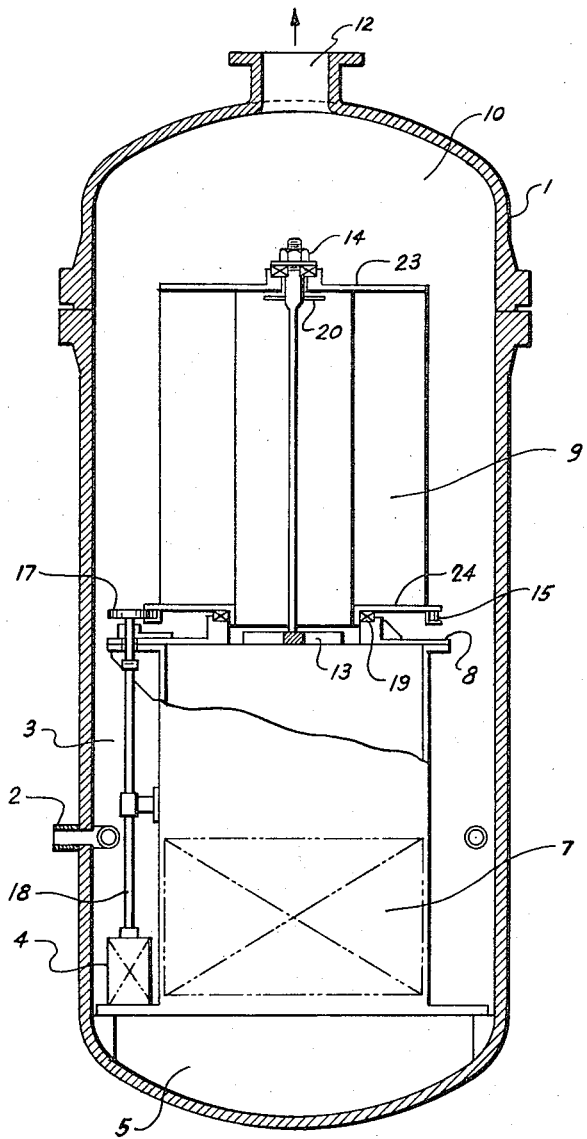
FIGURE 1 is a schematic illustration of a reactor vessel employing the instant invention.

FIGURE 1 illustrates a reactor vessel 1 which contains a boiling water reactor. Feedwater is introduced through the feedwater inlet nozzle 2 into the downcomer portion 3. Water passes through the circulating pump 4 to the lower chamber 5 and then passes upward through a plurality of tubes through the core 7. The steam and water mixture leaving the core is blocked by baffle plates 8 so that it must pass through the opening to the center of the arc separator 9. The steam-water mixture passes through the blades of the arc separator with the steam passing up through the steam dome 10 and through the steam outlet 12. Meanwhile the water which is separated by centrifugal action drains back to the downcomer portion 3.

The arc separator 9 is rotatably mounted on lower bearing 13 and upper bearing 14 and has a bull gear 15 around its lower edge. This gear meshes with the drive gear 17 which operates through shaft 18 to drive the circulating pump 4.

Labyrinth type seals 18 avoid steam leakage around the bottom of the rotating arc separator. Since water leakage is of no consequence at this point, these seals should be designed to pass water in preference to steam by using generally known reversing principles or a water trough seal. At the upper bearing 14 leakage of steam is of no consequence while leakage of water is to be avoided, therefore, baffle disc 20 is mounted directly below the bearing to prevent direct impingement of water thereon.

Figure 2:
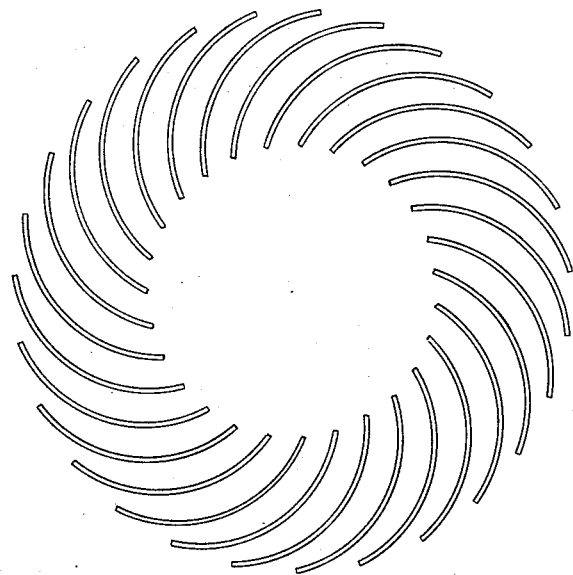
FIGURE 2 is a sectional plan view through the rotatable centrifugal separator of my invention.

FIGURE 2 is a sectional plan view through the arc separator. A plurality of vanes or blades 22 are secured between upper supporting plate 23 and lower supporting plate 24. These blades must be designed so that the proper centrifugal action is achieved from the steam-water mixture passing through these blades at full steam generation while the separator is rotating in the direction indicated.

Figure 3:
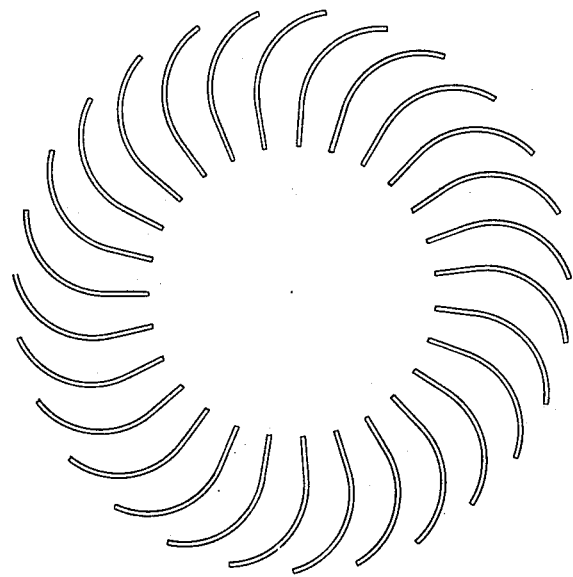
FIGURE 3 is a plan view through a fixed type centrifugal separator having separation characteristics which are equivalent to those of my separator when the unit is operating at full steam output.

In order to consider the design approach, let us assume that at full load steam output the desired void fraction or circulation ratio is known. This will establish the amount of circulation to be handled by pump 4. The static head of the fluid in the core as well as the static head in the downcomer can be calculated. The differential of these static heads together with the head produced by the pump 4 is the total head available for producing flow. On the other hand the frictional drop to be overcome includes that of the downcomers, the steam generating tubes through the core, and the pressure drop through the arc separator. The net hydrostatic head is constant for this design condition as well as is the friction drop through the entire loop, with the exception of the arc separator. Accordingly, it can be determined that the pump must supply the known flow at a known head plus the pressure drop through the arc separator. Conversely, the arc separator must rotate at such a speed as to drive the pump 4 to obtain the proper head. Although the same quantity of fluid is passing through the pump being driven as is passing through the driving arc separator, the volume is substantially different and there is sufficient capability to drive the pump similar to the capability of a steam turbine in an ordinary power plant to drive the feedwater pump for the boiler supplying the turbine. The desired arc of similar stationary type vanes or blades 25, as illustrated in FIGURE 3, must be established based on the desired centrifugal steam separating action. These blades must then be modified as are blades 22 in FIGURE 2 so that the steam and water passing therethrough imparts that power to the rotating arc separator to drive the pump while the effective arc of the rotating blade 22 with relation to the steam and water passing therethrough is that of the ideal blade 25.

The excess water being circulated through the core just goes along for the ride. The same volume of water passes through the arc separator as it passes through the pump 4. However that portion which is evaporated in passing through the steam outlet 8 passes through the pump 4 as the water and steam passes through the arc separator. Since this is the driving force of the entire mechanism, the rotation of the separator and of the pump is a function of the steam output of the reactor. Accordingly, at lower ratings the arc separator rotates less rapidly and the blades are effectively more sharply curved resulting in an increased centrifugal action which tends to maintain good separation at these lower steam flows where velocities tend to be low.

It can also be seen that the amount of fluid recirculated through pump 4 tends to increase as the steam output of the reactor increases since again it is this steam output which is the effective drive medium for the pump. The stimulation of circulation thereby achieved at higher outputs tends to decrease the amount of steam voids within the core. A smaller quantity of fuel is therefore required to obtain maximum steam output.

Instead of placing the feedwater inlet so as to introduce the water into downcomer 3, it could be placed as shown in FIGURE 4 where feedwater nozzle 32 introduces the feedwater into the water space 5 downstream of the circulating pump 4. By introducing the feedwater at this point there is a reduction in the amount of water which must be pumped thereby decreasing the pumping duty on the arc separator 9. The feedwater supply pressure however must be somewhat higher by an amount equal to the head of the pump 4.

It can be seen that the circulating system of my invention requires no external piping and is completely contained within the vessel shell 1. There are no power losses such as those imposed on external pumps due to turbine generator and motor inefficiencies in my system. The pressure drop through the rotating arc separator will necessarily be somewhat higher than that through the corresponding fixed arc separator due to the power delivery required from the separator. The only effect this has on the system is that the fluid pressure within the core is at a slightly higher value and the core therefore operates at a slightly higher temperature. All frictional losses within the system are directly returned to the system as heat with no heat being lost outside of the system.

While I have illustrated and described a preferred embodiment of my invention it is to be understood that such is merely illustrative and not restrictive and that variations and modifications may be made therein without departing from the spirit and scope of the invention. For instance, nozzles located so as to effect a centrifugal action may be used instead of blades or vanes. The pump may be directly connected with the rotatable separator on a single shaft, or a plurality of separators may be used to drive one or more pumps. I therefore do not wish to be limited to the precise details set forth but desire to avail myself of such changes as fall within the purview of my invention.

What I claim is:

1. A boiling water reactor organization comprising: a reactor core; means for passing water through the core and evaporating at least a portion of the water; a rotatably mounted steam water separator having a configuration such that fluid discharging therethrough is centrifugally discharged with the resultant tangential force being exerted on the separator by the discharging fluid; said separator mounted so as to receive the effluent from the core; means resisting the rotation of the separator which are a function of the rate of rotation of the separator, whereby when a high quantity of effluent is passing through the separator it rotates rapidly therefore effectively imparting a relatively low centrifugal action to the effluent, while when a low quantity of effluent is passing through the separator it rotates relatively slowly imparting a high centrifugal action to the effluent passing therethrough.

2. A boiling water reactor organization comprising: a reactor core; means for passing water through the core and evaporating at least a portion of the water; a rotatable centrifugal separator arranged to receive the effluent from said core; said separator comprising a plurality of vanes arranged so as to impart a centrifugal motion to the fluid passing therethrough; container means surrounding said centrifugal separator against which the effluent is thrown whereby the steam may be separated in an upward direction with the water passing in a downward direction; said rotatable separator being connected to a load which varies as a function of the rate of rotation of the separator, whereby when a high quantity of effluent is passing through the separator it rotates rapidly therefore effectively imparting a relatively low centrifugal action to the effluent, while when a low quantity of effluent passes through the separator it rotates relatively slowly imparting a high effective centrifugal action to the effluent passing therethrough.

3. A boiling water reactor organization comprising: a reactor core; means for passing water through the core and evaporating at least a portion of the water; a rotatable centrifugal separator arranged to receive the effluent from said core; said separator comprising a plurality of curved blades arranged around the periphery of the separator so as to impart a centrifugal motion to the fluid passing radially therethrough; container means surrounding said centrifugal separator against which the effluent is thrown whereby the steam may be separated in an upward direction with the water passing in a downward direction; said rotatable separator being connected to a load which varies as a function of the rate or rotation of the separator, whereby when a high quantity of effluent is passing through the separator it rotates rapidly therefore effectively imparting a relatively low centrifugal action to the effluent, while when a low quantity of effluent passes through the separator it rotates relatively slowly imparting a high effective centrifugal action to the effluent passing therethrough.

4. A boiling water reactor organization comprising: a reactor core; means for passing water through the core and evaporating at least a portion of the water; a rotatable centrifugal separator arranged to receive the effluent from said core; said separator comprising a plurality of vanes arranged so as to impart a centrifugal motion to the fluid passing therethrough and an opposite reactive force on the separator; container means surrounding said centrifugal separator against which the effluent is thrown whereby the steam may be separated in an upward direction with the water passing in a downward direction; downcomer means conveying the separated water to the inlet of the core; circulating pump means located in the downcomer system operative to stimulate circulation through the core; means mechanically connecting said rotatable separator and said circulating pump for driving said circulating pump by said rotatable separator.

5. A boiling water reactor organization comprising: a reactor core; means for passing water through the core and evaporating at least a portion of the water; means for returning the water leaving the core to the inlet of the core; circulating pump means in said means for returning water; a rotatable centrifugal separator arranged to receive the effluent from said core; said separator comprising a plurality of curved blades arranged around the periphery of the separator so as to impart a centrifugal motion to the fluid passing therethrough; container means surrounding said centrifugal separator against which the effluent is thrown whereby the steam may be separated in an upward direction with the water passing in a downward direction; said rotatable separator being connected to said circulating pump through mechanical drive means whereby the force resisting rotation of the separator varies as a function of the rate of rotation of the separator, and the water circulation varies as a function of the volume of effluent leaving the core so that when a high quantity of effluent is passing through the separator it rotates rapidly therefore effectively imparting a relatively low centrifugal action to the effluent and a relatively high rate of water circulation, while when a low quantity of effluent is passing through the separator it rotates relatively slowly imparting a high effective centrifugal action to the effluent passing therethrough and a relatively low rate of water circulation.

6. A boiling water reactor organization comprising: a reactor vessel; a reactor core mounted within said vessel; means for passing water through said core and evaporating at least a portion of the water; rotatably mounted driving means arranged so that the effluent passes therethrough effecting rotation of the driving means; means within the vessel for conveying water leaving the core to the entrance of the core; a circulating pump within the vessel operative to circulate water through the core; and mechanical means within the vessel connecting the rotatably mounted driving means with the circulating pump whereby the effluent passing through the driving means is operative to effect water circulation through the reactor core.

7. A boiling water reactor organization comprising: a reactor vessel; a reactor core mounted within said vessel; means for passing water through said core and evaporating at least a portion of the water; rotatably mounted driving means arranged so that the evaporated water passes therethrough effecting rotation of the driving means; means within the vessel for conveying water leaving the core to the entrance of the core; a circulating pump within the vessel operative to circulate water through the core; and mechanical means within the vessel connecting the rotatably mounted driving means with the circulating pump whereby the evaporated water passing through the driving means is operative to effect water circulation through the reactor core.

8. A boiling water reactor comprising: a reactor vessel; a core within said vessel; means for passing water through the core and evaporating at least a portion of the water; a circulating pump connected to effect recirculation of water through the core; rotatable steam driven means within the reactor vessel located so that the steam passing from the reactor core and leaving the reactor vessel must pass therethrough; and means connecting said steam driven means to said circulating pump for recirculating water through the core.

References Cited

UNITED STATES PATENTS

| | | | |
|---|---|---|---|
| 851,254 | 4/1907 | Rothenbucher | 55—405 |
| 3,057,333 | 10/1962 | Kuhner | 122—491 |
| 3,066,088 | 11/1962 | Blaser | 176—54 |
| 3,253,999 | 5/1966 | Weisman | 176—55 |
| 3,255,089 | 6/1966 | Deighton | 176—65 |

L. DEWAYNE RUTLEDGE, *Primary Examiner.*

CARL D. QUARFORTH, *Assistant Examiner.*